Dec. 13, 1927.

D. H. DEERY 1,652,707

INDICATOR FOR AUTOMOBILE LAMPS

Filed Nov. 5, 1924

INVENTOR.
DANIEL H. DEERY.
BY
ATTORNEY.

Patented Dec. 13, 1927.

1,652,707

UNITED STATES PATENT OFFICE.

DANIEL H. DEERY, OF BRIDGEPORT, CONNECTICUT, ASSIGNOR TO THE H. & H. LAMP CO., OF BRIDGEPORT, CONNECTICUT, A COPARTNERSHIP COMPOSED OF DANIEL H. DEERY AND WILLIAM HENNESSEY, BOTH OF BRIDGEPORT, CONNECTICUT.

INDICATOR FOR AUTOMOBILE LAMPS.

Application filed November 5, 1924. Serial No. 747,977.

The present invention relates to an indicator for automobile lamps, and has for an object to provide a device of this character which will positively indicate to the driver whether or not his lamps are lighted, so that in the event of one or the other of them going out, he may immediately replace or fix it, thereby protecting both himself and other motorists against the menace and danger of driving with only one lamp. A further object is to provide an indicating device adapted to be attached to the lamp casing at a point visible from the rear, and disposed in relation to the reflecting area within the lamp in such manner as to illuminate the visible portion when the lamp is lighted.

Other objects are to provide such a device of symmetrical form, requiring no fixed position in the lamp for its proper functioning, so that its installation will be facilitated and any shifting of the device while in use will not impair its operation.

A still further object is to provide an indicator, which will be substantially invisible from the front, presenting no obstruction to the light rays, and being free of any opaque or other structure which might detract from the uniformity of the normal light rays.

Other objects are to provide a device which will be easy to attach, and will not readily get out of order.

With the above and other objects in view, embodiments of the invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
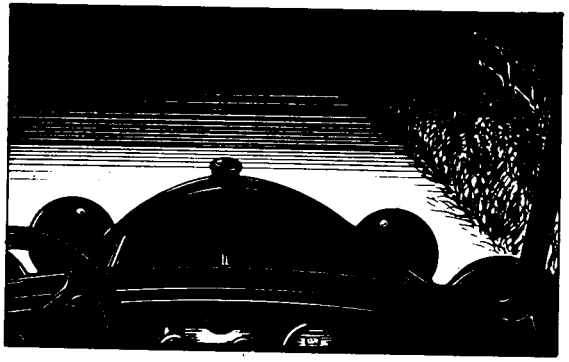
Fig. 1 is a view from the driver's seat of an automobile, at night, and showing the lighted head-lamps, provided with indicating devices, according to the present invention.
Figure 2:
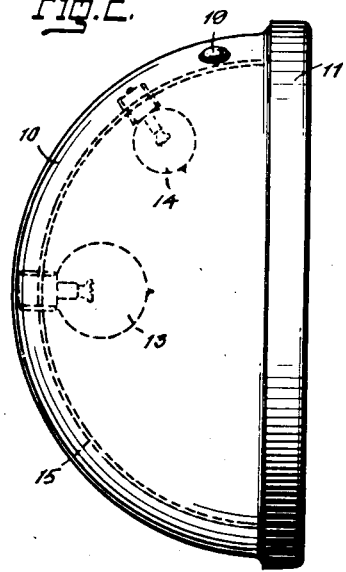
Fig. 2 is a side elevation of a head-lamp provided with the indicating device.
Figure 3:
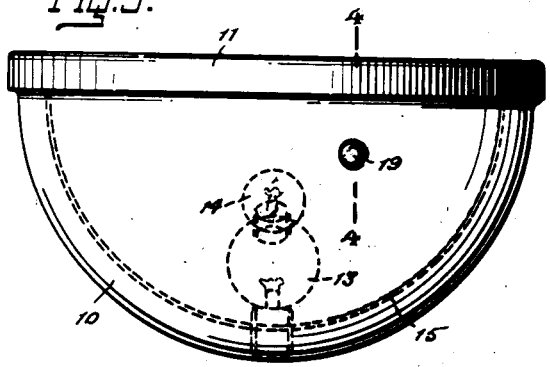
Fig. 3 is a top plan view thereof.
Figure 4:
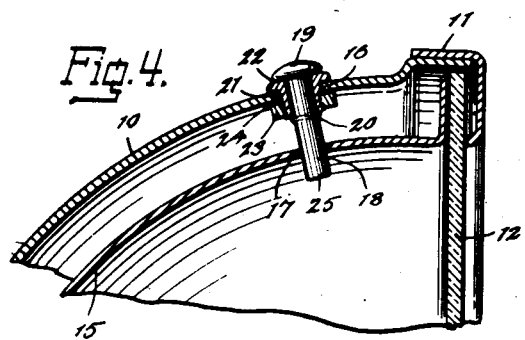
Fig. 4 is an enlarged vertical sectional view, taken along the line 4—4 of Fig. 3, and showing the device according to one embodiment of the invention.

Referring to the drawings, the head-lamps shown therein comprise a main body or casing 10 having a circular flanged rim 11 secured thereon by bayonet joints or the like, and holding in place the circular lens 12, the lamp also having the usual bright and dim light bulbs 13 and 14, and a reflector 15 spaced from the casing.

The indicating device, according to my invention, is provided in both head-lamps to indicate at the rear by showing spots of light at the rear of each lamp, and which are clearly visible to the driver, whether or not the lamps are lighted, it being immediately apparent to the driver when either one or both of them are out. This is clearly illustrated in Fig. 1.

The device, as shown in Figs. 1 to 4, is adapted to be secured to the lamp casing and extended inwardly through the reflector, and for this purpose the casing and reflector are respectively provided with aligned apertures 16 and 17, the axis of which is at a substantial right angle to the tangent of the surface of the casing. The device consists of a solid light conducting column 18, preferably cylindrical and formed of clear uncovered glass, so that the inner end portion, which is projected for a short distance within the reflector is substantially invisible from the front of the lamp, and there is no opaque or dark spot upon the surface of the reflector. At its outer end the column is provided with an integrally formed rounded head 19, and in inwardly spaced relation to the shoulder formed by said head there is formed an integral annular rib 20 for retaining the column against longitudinal displacement relatively to the securing means, presently to be described.

In this embodiment the securing means consists of a bushing 21 formed about the column between the head and rib, provided beneath the head with a flange 22 adapted to engage the outer surface of the casing about the aperture 16, and threaded along its cylindrical surface which is adapted to fit into the aperture. This bushing may be formed of hard rubber, bakelite, or other suitable material molded about the column, or it may be of metal spun down or otherwise secured thereon.

A retaining nut 23 is screwed upon the bushing from the inner end and is tightened against the inner surface of the casing to rigidly secure the column, a lock washer 24 being preferably interposed between the nut and the surface of the casing. The molding of the bushing about the glass and the drawing down of the flange 22 against the casing is such as to form a reliable and watertight connection. The rib 20 is spaced from the reflector an appreciable distance so that the device will fit lamps in which there is more or less variation in the space between the casing and reflector.

The inner cylindrical portion of the column, which is projected through the aperture 17 of the reflector, is slightly spaced from the wall of said aperture to allow for slight vibration, and the end 25 within the reflector is symmetrical in all directions with respect to the axis of the column, being in a flat plane at right angles to the axis in the present embodiment. This construction permits the column to be fitted into the casing in any position of angular rotation about its own axis, and will function with equal effect should there be any rotation of the column during use from vibration or other causes.

In operation, the light rays from the light bulb enter the column through both the cylindrical surface exposed within the reflector and the end surface, and strike at such angularity that they are reflected upwardly through the column and to the surface of the rounded head 19, so that a clear illuminated light spot is visible to the driver. Inasmuch as the entire portion of the column within the reflector is transparent, the device is substantially invisible from the front, so that the uniform appearance of the reflector is not marred, and there is no visible obstruction or impairment to the light rays.

Figure 5:
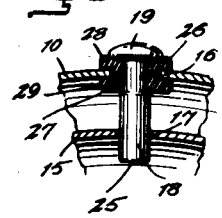
Fig. 5 is a sectional view, and showing the device according to a modified form of the invention.

In Fig. 5 there is illustrated a modified form of the invention, in which the column 18 is provided adjacent the head 19 with an annular recess 26, within which is engaged a flexible rubber collar 27 abutted at its ends by the head and the shoulder formed by the recess, and having flanges 28 and 29 at each end adapted to lockingly engage the outer and inner surfaces of the casing about the aperture 16 to form a substantially rigid support and watertight closure. The collar is inserted by compressing it and expanding it into locked position, and the column is forced in after insertion of the collar and is retained against longitudinal displacement by the shoulder of the recess portion.

Figure 6:
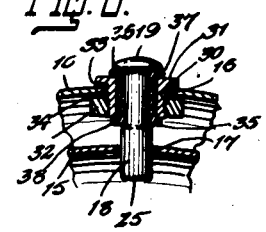
Fig. 6 is a sectional view, and showing the device according to a further modified form of the invention.

In Fig. 6 there is illustrated a further modified form, in which a tubular metal bushing 30, threaded exteriorly and provided at its upper end with an outwardly extending flange 31, is fitted into the aperture 16 and secured by a nut 32 at the inner side of the casing, a rubber sealing washer 33 being interposed beneath the flange 31, and a lock washer 34 being interposed between the nut and the casing. The column is provided with a reduced annular neck or recess 35 below the head, and is supported within the bushing by means of a flexible rubber collar 36 flanged at its ends, as at 37 and 38, adjacent the head and the shoulder formed by the neck of the column, and said flanged portions engaging the ends of the bushing. The assembly of the holding means illustrated in this and the other embodiments is very simple, and the same forms a reliable and substantial support, and a watertight closure.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:

1. In a lamp, a casing, a reflector within said casing, said casing and reflector being provided with aligned apertures, a light indicating device consisting of a column of light conducting material having a light emitting end disposed at the outside of the casing, said column extending inwardly through said apertures and having a light receiving end disposed within said reflector, said light emitting and receiving ends being symmetrical in all directions with respect to the axis of the column, whereby upon angular rotation of the column about its axis said light emitting and receiving ends will function with equal effect in any position of said angular rotation.

2. In a lamp, a casing, a reflector within said casing, said casing and reflector being provided with aligned apertures, a light indicating device consisting of a column of light conducting material having an enlarged annularly shouldered light emitting end disposed at the outside of the casing, said column extending inwardly through said apertures and having a light receiving end disposed within said reflector.

3. In a lamp, a casing, a reflector within said casing, said casing and reflector being provided with aligned apertures, a light indicating device consisting of a column of light conducting material having an enlarged light emitting head at one end disposed at the outside of the casing, said column extending inwardly through said apertures and having a light receiving end disposed within said reflector, and securing means engaged about said column beneath said head and secured in said aperture of the casing.

4. In a lamp, a casing, a reflector within said casing, said casing and reflector being provided with aligned apertures, a light indicating device consisting of a column of light conducting material having an enlarged light emitting head at one end disposed at the outside of the casing, and having a shoulder formed in inwardly spaced relation to said head and within the space between said casing and reflector, said column extending inwardly through said apertures and having a light receiving end disposed within said reflector, and securing means engaged about said column between said head and said shoulder and secured in said aperture of the casing, said column being held against relative longitudinal movement by co-operation between said head and shoulder and said securing means.

5. In a lamp, a casing, a reflector within said casing, said casing and reflector being provided with aligned apertures, a light indicating device consisting of a column of light conducting material having an enlarged light emitting head at one end disposed at the outside of the casing, said column extending inwardly through said apertures and having a light receiving end disposed within said reflector, and securing means engage about said column at the inner side of the casing and cooperating with said head to prevent relative longitudinal movement of said column.

Signed at Bridgeport, in the county of Fairfield, and State of Connecticut, this 3rd day of November, 1924.

DANIEL H. DEERY.